March 18, 1958  B. J. GREENBLOTT  2,827,625
MAGNETIC FLUX INDICATOR
Filed Aug. 28, 1956  2 Sheets-Sheet 1
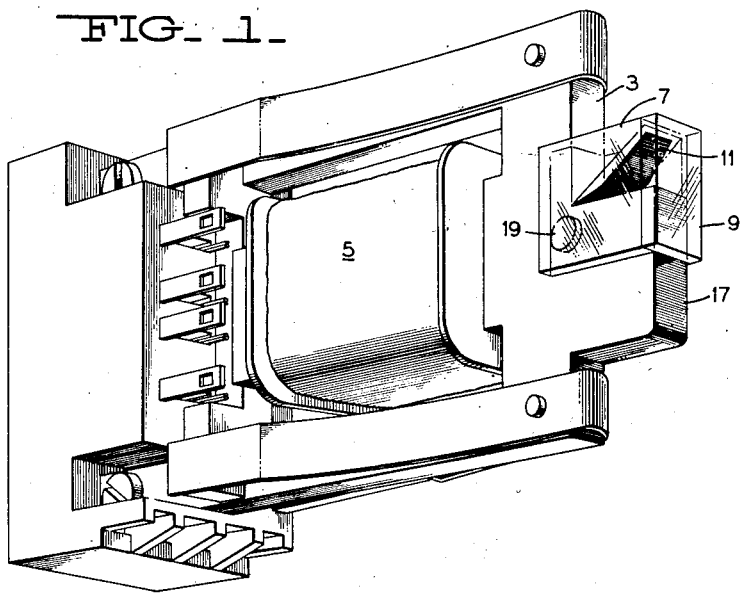
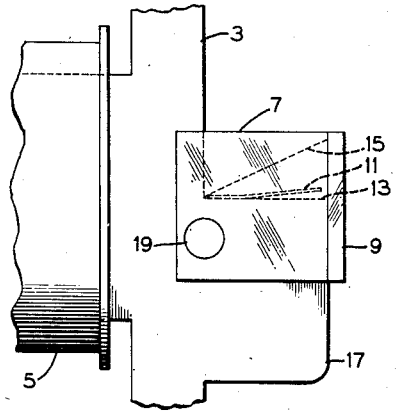
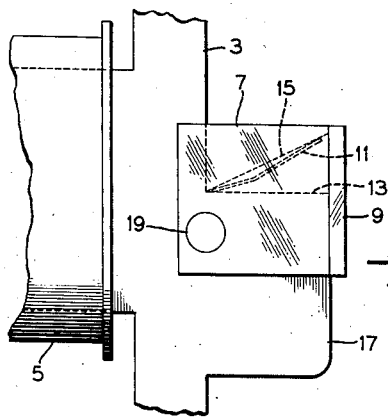
INVENTOR.
BERNARD J. GREENBLOTT
BY
AGENT.

March 18, 1958 B. J. GREENBLOTT 2,827,625
MAGNETIC FLUX INDICATOR
Filed Aug. 28, 1956 2 Sheets-Sheet 2

United States Patent Office 2,827,625
Patented Mar. 18, 1958

2,827,625

MAGNETIC FLUX INDICATOR

Bernard J. Greenblott, Binghamton, N. Y., assignor to International Business Machines Corporation, New York, N. Y., a corporation of New York Application August 28, 1956, Serial No. 606,751

11 Claims. (Cl. 340—252)

This invention relates to magnetic flux indicators, and particularly to an economical and simple means for optically indicating, in a qualitative manner, the presence or absence of magnetic flux at a given location.

Numerous devices, such as relays, solenoids, and transformers, for example, involve magnetic fields in their operation. Although the principal portion of the magnetic flux set up by such devices is confined within the magnetic cores associated therewith, there is usually a certain amount of stray or leakage flux which exists in a field external to the core. Since the presence or absence of this leakage flux is indicative of energization or deenergization of the magnetic device, it follows that such leakage flux might be utilized to indicate whether or not the associated device is energized. Since the leakage flux is relatively small compared with the total flux, any device which is to be operated by the leakage flux will necessarily have to operate on relatively small values of flux.

If an indicating device is available to operate on relatively small values of flux, such flux can be generated by a current flowing in a suitable winding, so that the device may also be used to indicate the presence or absence of a small current in a circuit, such as found in certain transistor circuits.

When applied to devices, such as relays, for example, indicators of the type contemplated herein may be used in large quantities to provide a quick visual check of the operated or unoperated condition of large numbers of relays, as found for example in electric accounting machines, automatic telephone switching systems and the like. For this reason, such indicators should be economical to manufacture, easy to apply, and relatively small.

Accordingly, it is an object of this invention to provide an improved optical magnetic flux indicator.

Another object of the invention is to provide an improved optical magnetic flux indicator having a single movable part which requires only a small value of flux for its operation.

A further object of the invention is to provide an improved optical magnetic flux indicator in which a magnetizable vane is operated by the flux to be detected, in such manner that the position of the vane is discernable either by transmission or reflection of light.

Still another object of the invention is to provide an improved optical magnetic flux indicator which is small in size and which may be arranged to provide qualitative indications of the energization of electrical circuits.

Another object of the invention is to provide an improved indicator for indicating the flow of small values of current, such as in certain transistor circuits.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is an isometric view of a first preferred embodiment of the invention, as applied to an electromagnetic relay.

Figs. 2 and 3 are side views of the arrangement shown in Fig. 1, illustrating the unoperated and operated conditions of the device.

Similar reference characters refer to similar parts in each of the several views.

Figure 4:
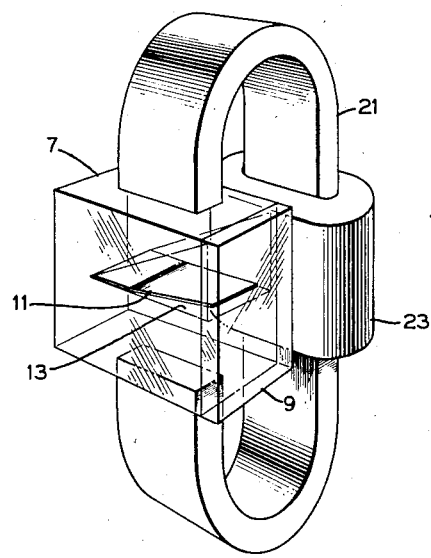
Fig. 4 is an isometric view of a second preferred embodiment of the invention, employed as a current indicator.

Briefly described, an indicator constructed in accordance with this invention comprises a housing of non-magnetic material, at least one wall of the housing, such as the front or viewing surface, being transparent, and a thin opaque vane of magnetic material disposed within the housing. Suitable limiting surfaces are provided within the housing to define the limits of motion of the vane. The parts are proportioned and arranged so that the vane normally rests in a first position in the housing in the absence of the magnetic field which it is desired to detect, and takes up a second position in the presence of the magnetic field, as a result of the vane aligning itself, to the extent permitted by the limiting surfaces within the housing, with the lines of flux. The two positions of the vane are readily distinguished by the observer by arranging the device so that in one position only the edge of the vane is in the observer's line of sight, while in the other position, a substantial area of the vane is in the line of sight. Observation by reflected light is assisted by providing a surface of the vane with a selective absorption, so that the surface of the vane is made particularly distinctive optically with respect to its background. Observation by transmitted light is obtained by having the vane intercept a light beam in one of its two positions in the manner of a shutter.

Referring now to Fig. 1 of the drawings, there is shown an indicator of the type utilizing reflected light, applied to an electromagnetic relay to indicate whether or not the relay is energized. The structure of the relay is similar to that disclosed and claimed in a copending application for Letters Patent of the United States, Serial No. 585,508, filed on May 17, 1956, but it is to be understood that the invention is not limited to use with relay structures of the type shown but may be employed with any type of electromagnetic device. The relay includes a core 3 of magnetic material, having mounted on the center leg thereof an operating winding 5, which when energized sets up the necessary operating flux in the core. A certain amount of the flux set up by winding 5 escapes from the core and this leakage flux sets up a magnetic field in the space around the core. Particularly the flux in the center leg of the core has a leakage component which leaves or enters the core, depending upon relative polarity, at or near the projected center line of the core and fans out to reenter or leave the core along the two outer legs.

Attached to the core, either permanently or temporarily as desired, and by any suitable means, is a non-magnetic housing 7, of any suitable shape, such as a parallelepipedon as shown. At least the front surface 9 of housing 7 is fabricated of transparent material, in order that an observer may view the interior of housing 7. The remaining portions of the housing 7 may be transparent or not, as desired. The housing contains a small vane 11, substantially rectangular in shape, made of suitable magnetizable material. Preferably the vane is as thin and light as possible, consistent with a fair degree of rigidity. Within housing 7 there is provided a first internal limiting surface 13 and a second internal limiting surface 15, disposed in a converging angular relation as shown, which serves as limits or stops for vane 11. One of the surfaces, such as 13, defines the normal or resting position of vane 11, and is arranged so that the vane, which is biased by gravity to rest on this surface, presents only its edge, or a very small projected area, to an observer viewing the indicator through the front surface 9. The second surface 15 is disposed at an angle to the first surface, so that when the vane attempts to align itself with the lines of leakage emanating from core 3, the vane 11 rests against surface 15, in which position it presents a relatively large projected area to an observer looking through front surface 9.

To make the differentiation between its two positions even more distinct, the viewing surface of the vane, that is, the surface which is seen by an observer when the vane is deflected, may be distinctively colored, or provided with a suitable reflecting coating, such as a mirror surface, to render it more visible to an observer.

Preferably, the vane is bent at a very small angle intermediate its ends, as shown, in order to eliminate any surface adhesion effects between the vane and the internal surfaces of the housing.

Fig. 2 is a partial side view of Fig. 1, showing the indicator vane in its normal position, and Figs. 1 and 3 illustrate the position which the vane takes when the coil 5 is energized and leakage flux is present in the space around the core 3.

As shown in these drawings the core 3 may be provided with one or more extensions or projections such as the projection 17, to enhance the effect of the leakage flux on vane 11, and to direct the leakage flux into a path or paths which will most efficiently affect the vane. Such projections are not absolutely required, but are preferable to increase the sensitivity of the device. Such an extension may also provide one of the internal surfaces 13, as shown.

In the arrangement illustrated by Figs. 1, 2 and 3, the housing 7 is provided with internal bosses or buttons which provide concentrated frictional pressure with the core 3 to retain the indicator in place, but other retaining means may obviously be employed. It will be seen also that the indicator may be constructed and arranged to be readily detachable, so that, for example, one or more temporary indicators may be attached to a selected one or ones of a plurality of relays when it is necessary to check their operation, rather than providing a permanent indicator for each relay.

As pointed out hereinbefore, an indicator constructed in accordance with the invention is quite sensitive and hence may be operated by magnetic fields set up by relatively small currents flowing through a suitable winding.

Fig. 4 shows one arrangement which may be employed as a sensitive current indicator. An indicator similar to that shown in Figs. 1 through 3 is disposed between the poles of an electromagnet, which includes a C-shaped core 21 and a winding 23. When winding 23 is energized, the flux created thereby is concentrated and directed through the housing 7 by core 21, so that vane 11 attempts to align itself with the flux passing between the poles of core 21, and thus provides a visual indication of the energization of winding 23. Since the flux required to operate vane 11 is very small, it follows that the current required for winding 23 may also be very small, even with a relatively small number of turns in winding 23.

Figure 5:
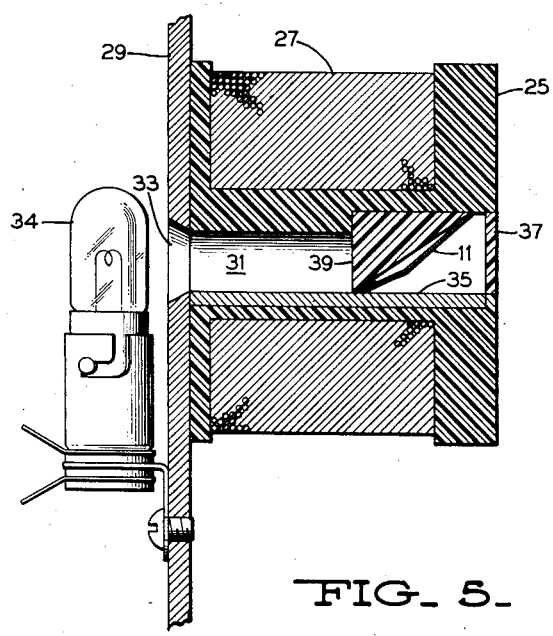
Fig. 5 is a cross-sectional view of a third preferred embodiment of the invention, employed as a current indicator.

Fig. 5 shows a cross-sectional view of still another modification of the invention, illustrating the manner in which a visual indication may be obtained by the control of transmitted light. In this view the indicator is incorporated in a non-magnetic bobbin 25 having a winding 27 and mounted by any suitable means on a panel or support 29. A central opening or passage 31 extends through the bobbin and is aligned with an aperture 33 in the support. A suitable light source, such as the lamp 34, is disposed so that light rays therefrom are projected through the aperture 33 and passage 31. Disposed within passage 31 is a bar 35 of magnetizable material which serves to concentrate the axial flux created by energization of winding 27. The right-hand end of passage 31 is closed by a plate 37 of transparent non-magnetic material. Also disposed within passage 31 are a vane 11 and a guide piece or block 39, which is made of transparent non-magnetic material.

The indicator in Fig. 5 is shown in its energized condition, with vane 11 deflected upward against block 39 by the axial magnetic field set up by winding 27. It can be seen that in this condition the vane 11 blocks the passage of light through passage 31, whereas, when the indicator is deenergized and vane 11 assumes a horizontal position by gravity, the passage of light through passage 31 is substantially uninterrupted. These two states are readily discerned by an observer viewing the indicator from the right.

From these examples, it will be apparent to those skilled in the art that an indicator constructed in accordance with this invention may be readily employed in any case where the operation of apparatus is accompanied by the creation of a magnetic field, which may constitute either the leakage flux incident to the working flux in a piece of electrical apparatus, or may be a field particularly created for the purpose of operating the indicator.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A magnetic flux indicator comprising a non-magnetic housing adapted to be placed in the region where the flux exists, and a magnetizable vane disposed within said housing, said vane occupying a first or a second position within said housing in accordance with the presence or absence of magnetic flux in the region of said housing, and arranged to provide a first or a second distinctive aspect to an observer in accordance with its position in said housing.

2. A magnetic flux indicator comprising a non-magnetic housing having at least one transparent wall, a vane of magnetizable material disposed within said housing, and limiting surfaces within said housing for limiting the positions which may be occupied by the vane to a first and a second position, in accordance with the absence or presence of magnetic flux in the region of said housing, said vane presenting a different aspect for each of said two positions when viewed through said transparent wall.

3. A magnetic flux indicator comprising a non-magnetic housing having at least one transparent wall, a vane of magnetizable material disposed within said housing, and a first and a second limiting means within said housing for limiting the motion of said vane within the housing to rotation about at least a portion of the perimeter of the vane between a first and a second position in accordance with the absence or presence of magnetic flux in the region of said housing, said vane presenting different projected areas to view through said transparent wall in accordance with said first and second position.

4. A magnetic flux indicator comprising a non-magnetic housing having at least one transparent wall, a first and a second limiting surface within said housing, said surfaces converging to a pivot-defining intersection within said housing, a rectangular vane of magnetizable material disposed within said housing with one end thereof adjacent said pivot-defining intersection whereby said vane is enabled to move between a first and a second angular position within said housing, said vane providing a first and a second aspect to an observer through said transparent wall in accordance with said first or second angular position.

5. A magnetic flux indicator for indicating the presence or absence of magnetic flux having a predetermined direction in a prescribed region, comprising a non-magnetic housing disposed in said region and having at least one transparent wall, a first and a second limiting surface within said housing, said surfaces converging to a pivot-defining intersection within said housing, said first surface being disposed in a substantially horizontal plane and said second surface being disposed substantially in line with the direction of said flux, a rectangular vane of magnetizable material disposed within said housing with one end thereof adjacent said pivot-defining intersection, said vane normally resting on said first surface and presenting a first aspect to an observer through said transparent wall, and taking up a second position against said second surface when said magnetic flux is present to thereby present a second aspect to an observer through said transparent wall.

6. A magnetic flux indicator for indicating the presence or absence of leakage flux in the space external to the core of an electromagnetic device, comprising, a non-magnetic housing positioned adjacent said core and having at least one transparent wall through which the interior of the housing may be observed, said leakage flux passing through said housing in a predetermined direction when said electro-magnetic device is energized, a first and a second limiting surface within said housing, said surfaces converging to a pivot-defining intersection within said housing, and a magnetizable vane disposed in said housing and biased to normally rest on said first surface, in which position said vane presents a first aspect when viewed through said transparent wall, the parts being proportioned and arranged so that said vane moves to a second position defined by said second surface in response to the presence of leakage flux, said vane presenting a second aspect when in said second position.

7. A magnetic flux indicator for indicating the presence or absence of leakage flux in the space external to the core of an electromagnetic device, comprising, a non-magnetic housing positioned adjacent said core and having at least one transparent wall through which the interior of the housing may be observed, means for directing leakage flux from said core through said housing in a predetermined direction when said electromagnetic device is energized, a first and a second limiting surface within said housing, said surfaces converging to a pivot-defining intersection within said housing, said first surface lying in a substantially horizontal plane and said second surface lying in a plane substantially concurrent with said predetermined direction, and a magnetizable vane disposed in said housing and biased to normally rest on said first surface, in which position said vane presents a first aspect when viewed through said transparent wall, the parts being proportioned and arranged so that said vane moves to a second position defined by said second surface in response to the presence of leakage flux, said vane presenting a second aspect when in said second position.

8. A current indicator for indicating the presence or absence of relatively small values of current in an electrical circuit, comprising, in combination, a winding connected with said circuit to create magnetic flux having a predetermined direction in a portion of the space adjacent said winding, a non-magnetic housing positioned to have said flux pass through the housing in said predetermined direction, at least one wall of said housing being transparent, first and second limiting surfaces disposed within said housing, said first limiting surface being substantially horizontal and said second limiting surface being disposed at an angle to said first surface and substantially aligned in said predetermined direction of said flux, and a vane of magnetizable material disposed within said housing for movement between a first and a second position defined by said first and said second limiting surfaces respectively, said vane being biased to normally assume said first position in which it presents a first aspect to an observer through said transparent wall, said vane moving to said second position in response to said flux, wherein it presents a second aspect to an observer through said transparent wall.

9. A current indicator for indicating the presence or absence of relatively small values of current in an electrical circuit, comprising, in combination, a winding adapted to be connected with said circuit to create magnetic flux when said circuit is energized, a non-magnetic housing having at least one transparent wall, means for directing the flux created by said winding through said housing in a predetermined direction, first and second limiting surfaces disposed within said housing, said first limiting surface being substantially horizontal and said second limiting surface being disposed at an angle to said first surface, and a magnetizable vane disposed within said housing, said vane being normally biased by gravity to a resting position on said first surface, in which position said vane presents a first aspect to an observer through said transparent wall, and said vane being moved by said flux to an operated position against said second surface in which position said vane presents a second aspect to an observer through said transparent wall.

10. A current indicator for indicating the presence or absence of relatively small values of current in an electrical circuit, comprising, in combination, a nonmagnetic bobbin, a winding mounted on said bobbin and adapted to be connected with said circuit, an axial passage in said bobbin substantially coinciding with the axis of said winding, a transparent wall at one end of said passage, a light source at the other end of said passage adapted to transmit light through said passage and said wall, and a magnetizable vane disposed in said passage, and arranged so that the transmission of light through said passage is governed by the position of said vane.

11. A current indicator for indicating the presence or absence of relatively small values of current in an electrical circuit, comprising, in combination, a nonmagnetic bobbin, a winding mounted on said bobbin and adapted to be connected with said circuit, an axial passage in said bobbin substantially coinciding with the axis of said winding, a transparent wall at one end of said passage, a light source at the other end of said passage adapted to transmit light through said passage and said wall, a magnetizable vane disposed in said passage, and a transparent guide block disposed in said passage, said guide block confining the motion of said vane between a first position in which said vane is substantially aligned with said passage so that light is transmitted therethrough substantially unimpeded, and a second position in which said vane substantially obstructs the transmission of light through said passage.

References Cited in the file of this patent
UNITED STATES PATENTS

| 2,605,331 | Gordon | July 29, 1952 |
| 2,664,558 | Konet et al. | Dec. 29, 1953 |
| 2,671,208 | Lamb | Mar. 2, 1954 |